United States Patent
Atoji

(10) Patent No.: US 6,982,991 B1
(45) Date of Patent: Jan. 3, 2006

(54) CELL OR FRAM ASSEMBLY METHOD AND APPARATUS OPTIMIZING THE MOVING OF DATA

(75) Inventor: David Masao Atoji, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,467

(22) Filed: Mar. 10, 2000

(51) Int. Cl.
    *H04J 3/24* (2006.01)
(52) U.S. Cl. .................................................. 370/474
(58) Field of Classification Search ................ 370/394, 370/395.1, 395.4, 395.5, 395.52, 395.7, 395.71, 370/395.72, 428, 429, 465, 466, 468, 470, 370/471, 473, 474, 475
    See application file for complete search history.

(56) References Cited

U.S. PATENT DOCUMENTS

| | | | | |
|---|---|---|---|---|
| 5,050,166 A | | 9/1991 | Cantoni et al. ............ 370/94.1 |
| 5,113,392 A | | 5/1992 | Takiyasu et al. ......... 370/85.15 |
| 5,136,584 A | * | 8/1992 | Hedlund .................... 370/399 |
| 5,375,121 A | * | 12/1994 | Nishino et al. ............. 370/473 |
| 5,412,655 A | | 5/1995 | Yamada et al. ............... 370/60 |
| 5,440,552 A | | 8/1995 | Sugita ......................... 370/60 |
| 5,541,926 A | | 7/1996 | Saito et al. ................ 370/94.2 |
| 5,555,261 A | | 9/1996 | Nakayama et al. ......... 370/103 |
| 5,602,853 A | | 2/1997 | Ben-Michael et al. ...... 370/474 |
| 5,689,501 A | | 11/1997 | Takase et al. ............... 370/244 |
| 5,768,274 A | * | 6/1998 | Murakami et al. ....... 370/395.7 |
| 5,856,977 A | * | 1/1999 | Yang et al. ............ 370/395.72 |
| 5,878,045 A | | 3/1999 | Timbs ........................ 370/466 |
| 6,052,368 A | * | 4/2000 | Aybay ........................ 370/357 |
| 6,201,813 B1 | * | 3/2001 | Klausmeier et al. ........ 370/412 |
| 6,317,433 B1 | * | 11/2001 | Galand et al. ........... 370/395.2 |
| 6,546,012 B2 | * | 4/2003 | Kamo et al. ............. 370/395.1 |
| 6,714,562 B1 | * | 3/2004 | Calvignac et al. .......... 370/474 |

* cited by examiner

*Primary Examiner*—Kwang Bin Yao
(74) *Attorney, Agent, or Firm*—Joscelyn G. Cockburn

(57) ABSTRACT

In a network node, a method and apparatus to assemble fixed cell length cells resulting from the segmenting of variable length frames into cells. The hardware implementations of the preferred embodiments of the invention comprise a finite state machine which handles three processes at the same time, one for fetching the frame data stored in a storage unit, the data store, one for moving data from the frame data and control block data to the cell and one for outputting cell data. The other components are a counter for the pointing to the frame and a multiplexer for selecting the correct data to form the cell.

16 Claims, 16 Drawing Sheets

| R0 | A1 | cell (C3:C0) <= Cell Header Data |
|---|---|---|
| R1 | D1 | cell (C3:C2) <= Cell Header Data<br>cell (C1:C0) <= Data (PIB + 2) |
| R2 | D2 | cell (C3:C0) <= Data (PIB + 4) |
| R3 | D2 | cell (C3:C0) <= Data (PIB + 4) |
| R4 | D2 | cell (C3:C0) <= Data (PIB + 4) |
| R5 | D2 | cell (C3:C0) <= Data (PIB + 4) |
| R6 | D2 | cell (C3:C0) <= Data (PIB + 4) |
| R7 | D2 | cell (C3:C0) <= Data (PIB + 4) |
| R8 | D2 | cell (C3:C0) <= Data (PIB + 4) |
| R9 | D2 | cell (C3:C0) <= Data (PIB + 4) |
| R10 | D2 | cell (C3:C0) <= Data (PIB + 4) |
| R11 | D2 | cell (C3:C0) <= Data (PIB + 4) |
| R12 | D2 | cell (C3:C0) <= Data (PIB + 4) |
| R13 | D2 | cell (C3:C0) <= Data (PIB + 4) |
| R14 | D2 | cell (C3:C0) <= Data (PIB + 4) |
| R15 | D2 | cell (C3:C0) <= Data (PIB + 4) |

610

| A2 | cell (C3:C2) <= Cell Header Data<br>cell (C1:C0) <= Frame Header Data |
|---|---|
| A3 | cell (C3:C0) <= Frame Header Data |
| A3 | cell (C3:C0) <= Frame Header Data |

| R0  | A1 | cell (C3:C0) <= Cell Header Data |
|-----|----|----|
| R1  | D1 | cell (C3:C2) <= Cell Header Data<br>cell (C1:C0) <= Data (PIB + 2) |
| R2  | D2 | cell (C3:C0) <= Data (PIB + 4) |
| R3  | D2 | cell (C3:C0) <= Data (PIB + 4) |
| R4  | D2 | cell (C3:C0) <= Data (PIB + 4) |
| R5  | D2 | cell (C3:C0) <= Data (PIB + 4) |
| R6  | D2 | cell (C3:C0) <= Data (PIB + 4) |
| R7  | D2 | cell (C3:C0) <= Data (PIB + 4) |
| R8  | D2 | cell (C3:C0) <= Data (PIB + 4) |
| R9  | D2 | cell (C3:C0) <= Data (PIB + 4) |
| R10 | D2 | cell (C3:C0) <= Data (PIB + 4) |
| R11 | D2 | cell (C3:C0) <= Data (PIB + 4) |
| R12 | D2 | cell (C3:C0) <= Data (PIB + 4) |
| R13 | D2 | cell (C3:C0) <= Data (PIB + 4) |
| R14 | D2 | cell (C3:C0) <= Data (PIB + 4) |
| R15 | D2 | cell (C3:C0) <= Data (PIB + 4) |

1002

| A2 | cell (C3:C2) <= Cell Header Data<br>cell (C1:C0) <= Frame Header Data |
|----|----|
| A3 | cell (C3:C0) <= Frame Header Data |
| A3 | cell (C3:C0) <= Frame Header Data |

1003

| O7 | cell (C3:C0) <= Overlay Data (PIB + 4) |
|----|----|

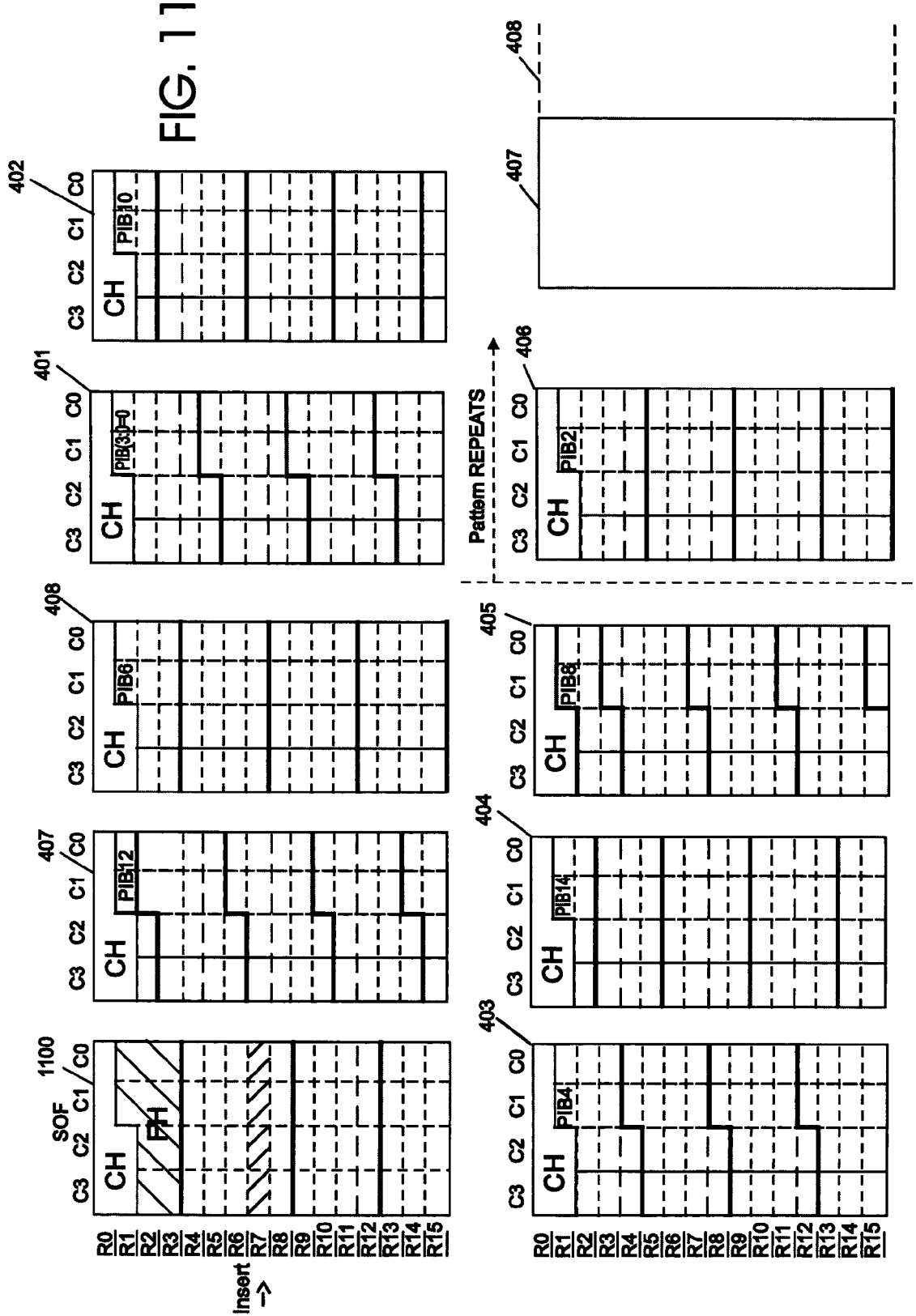

| | | |
|---|---|---|
| R0 | A1 | cell (C3:C0) <= Cell Header Data |
| R1 | D1 | cell (C3:C2) <= Cell Header Data<br>cell (C1:C0) <= Data (PIB + 2) |
| R2 | D2 | cell (C3:C0) <= Data (PIB + 4) |
| R3 | D2 | cell (C3:C0) <= Data (PIB + 4) |
| R4 | D2 | cell (C3:C0) <= Data (PIB + 4) |
| R5 | D2 | cell (C3:C0) <= Data (PIB + 4) |
| R6 | D2 | cell (C3:C0) <= Data (PIB + 4) |
| R7 | D2 | cell (C3:C0) <= Data (PIB + 4) |
| R8 | D2 | cell (C3:C0) <= Data (PIB + 4) |
| R9 | D2 | cell (C3:C0) <= Data (PIB + 4) |
| R10 | D2 | cell (C3:C0) <= Data (PIB + 4) |
| R11 | D2 | cell (C3:C0) <= Data (PIB + 4) |
| R12 | D2 | cell (C3:C0) <= Data (PIB + 4) |
| R13 | D2 | cell (C3:C0) <= Data (PIB + 4) |
| R14 | D2 | cell (C3:C0) <= Data (PIB + 4) |
| R15 | D2 | cell (C3:C0) <= Data (PIB + 4) |

1302

| | |
|---|---|
| A2 | cell (C3:C2) <= Cell Header Data<br>cell (C1:C0) <= Frame Header Data |
| A3 | cell (C3:C0) <= Frame Header Data |
| A3 | cell (C3:C0) <= Frame Header Data |

1303

| | |
|---|---|
| I7 | cell (C3:C0) <= Insert Data (don't increment PIB) |

| | | |
|---|---|---|
| R0 | A1 | cell (C3:C0) <= Cell Header Data |
| R1 | D1 | cell (C3:C2) <= Cell Header Data<br>cell (C1:C0) <= Data (PIB + 2) |
| R2 | D2 | cell (C3:C0) <= Data (PIB + 4) |
| R3 | D2 | cell (C3:C0) <= Data (PIB + 4) |
| ROW4 | D2 | cell (C3:C0) <= Data (PIB + 4) |
| ROW5 | D2 | cell (C3:C0) <= Data (PIB + 4) |
| ROW6 | D2 | cell (C3:C0) <= Data (PIB + 4) |
| ROW7 | D2 | cell (C3:C0) <= Data (PIB + 4) |
| ROW8 | D2 | cell (C3:C0) <= Data (PIB + 4) |
| ROW9 | D2 | cell (C3:C0) <= Data (PIB + 4) |
| ROW10 | D2 | cell (C3:C0) <= Data (PIB + 4) |
| ROW11 | D2 | cell (C3:C0) <= Data (PIB + 4) |
| ROW12 | D2 | cell (C3:C0) <= Data (PIB + 4) |
| ROW13 | D2 | cell (C3:C0) <= Data (PIB + 4) |
| ROW14 | D2 | cell (C3:C0) <= Data (PIB + 4) |
| ROW15 | D2 | cell (C3:C0) <= Data (PIB + 4) |

1602:

| | |
|---|---|
| A2 | cell (C3:C2) <= Cell Header Data<br>cell (C1:C0) <= Frame Header Data |
| A3 | cell (C3:C0) <= Frame Header Data |
| A3 | cell (C3:C0) <= Frame Header Data  1603 |
| B1 | cell (C3:C0) <= Frame Header Data |
| B1 | cell (C3:C0) <= Frame Header Data |
| B2 | cell (C3:C2) <= Frame Header Data<br>cell (C1:C0) <= Data (PIB + 2) |
| B1 | cell (C3:C0) <= Frame Header Data  1604 |
| B1 | cell (C3:C0) <= Frame Header Data |
| B2 | cell (C3:C2) <= Frame Header Data<br>cell (C1:C0) <= Data (PIB + 2) |
| B1 | cell (C3:C0) <= Frame Header Data  1605 |
| B1 | cell (C3:C0) <= Frame Header Data |
| B2 | cell (C3:C2) <= Frame Header Data<br>cell (C1:C0) <= Data (PIB + 2) |

CELL OR FRAM ASSEMBLY METHOD AND APPARATUS OPTIMIZING THE MOVING OF DATA

CROSS-REFERENCE TO RELATED APPLICATION

The present application relates to application Ser. No. 09/522,369 filed the same day than the present invention and assigned to the assignee of the present invention.

FIELD OF THE INVENTION

The present invention relates to network equipment receiving and transferring data packets on network lines and having to segment these packets into fixed length cells or to reassemble the packets from fixed length cells. More particularly, this invention relates to network adapters or blades performing such conversions.

BACKGROUND OF THE INVENTION

Segmenting variable length frames into fixed length cells or reassembling variable length frames from fixed length cells is handled today on network node adapters. The conversion from variable length frame to fixed length cells is commonly called segmenting even if the frame length is longer or smaller than the cell length. Similarly, reassembly is used when one uses fixed length cells to rebuild the variable length frame whatever the size of the cells compared to the size of the frame. If the frame segment length is smaller than the cell size, two frames segments can be packed into one cell. This will save bandwidth since it prevents sending a cell that is not entirely filled with frame data.

For this invention, the variable length frames can be any length and any protocol (Ethernet, Token Ring, or others). The fixed length cells are 4 column by 16 row cells (64 units total) where units can be either in bits, bytes or any multiplier of bits or bytes. For simplicity, bytes will be used from now on. Each cell will have a 6 byte cell header. An optional 10 byte frame header can also be used after the cell header of the first cell. The contents and format of the cell and frame header and frame segment is not important for this invention. An example of a 64 byte fixed length cell is the cell length used with the IBM PRIZMA multiprotocol switch.

One case of segmenting variable length frames into fixed length cells is having to perform network protocol conversions when routing traffic from one network port to another. This is the case when variable length frames (such as Ethernet or Token-Ring frames) are received on an input LAN network line of an adapter and are routed to another output port as fixed length PRIZMA cells on the same adapter. Another case applies to a network node comprising a switching fabric supporting fixed length cells. The LAN frames received from LAN network lines need to be converted into fixed length PRIZMA cells before being sent to the bus of the switch fabric which will switch the cells toward a separate target adapter or blades. A variation of both these cases is to have a fixed length ATM cell and convert into a fixed length PRIZMA cell.

As these segmenting or reassembly functions are always used in network equipment and should sustain media speed or the switch fabric speed, the network equipment manufacturers usually try to optimize the design of such functions. More particularly, in the implementation of the segmenting function, the data movement from the buffers storing the data received from the network lines toward the cell buffer must be optimized.

The background art with segmenting and reassembly comprises hardware oriented solutions using a non-negligible number of pointers and counters. To move the frame that has been received and buffered in the input buffer of a network equipment, pointers and counters are needed for keeping track of the data movement. Pointers are needed, for instance, to point to the offset in the input buffer of the next data to be moved to the output buffer and to point to the last data moved in the input buffer. Similarly, counters are needed to store the number of bits or bytes of the cell or the frame or the headers to be moved or already moved. The same needs for counters and pointers occurs when one wants to reassemble the frames. In U.S. Pat. No. 5,375,121, the flow chart of the cell assembly method illustrated in FIG. 10 for converting network data into fixed length ATM cells, uses a significant number of pointers and counters. This has the inconvenience of using storage space and providing a complex process to coordinate all these counters.

The conversion from variable length frame to fixed length cells is commonly called segmenting either if the frame length is longer or smaller than the cell length. Similarly, reassembly is used when one used fixed length cells to rebuild the variable length frame whatever the size of the cells compared to the size of the frame. If the frame length is smaller than the cell size, the frame will be packed in cells.

Particularly, it the apparatus is integrated on a chip, the greater the number of pointers and counters, the more space for gates (conditional logic and registers) and electrical power are needed on that chip. It is well known that for integration on a chip, the electrical power needed and the number of gates must be limited. Network chip manufacturers have thus to avoid such disadvantages to make competitive components.

SUMMARY OF THE INVENTION

It is a general object of the present invention to provide a fixed length packet assembly method and apparatus while limiting the number of pointers and counters for moving data in order to optimize the hardware implementation.

This object of the invention is achieved by a cell assembly apparatus assembling, in an output cell, 64 unit fixed length cells resulting from the segmenting of a variable length packet stored as words in a storage unit, said apparatus using segmenting information stored in a storage control block and comprising:

a bus connected to an external interface to request and receive acknowledgment of segmenting information availability;

a first input data bus connected to the storage control block to read the segmenting information;

a second input data bus connected to the storage unit to read said variable length data packet;

a multiplexer having two said input data buses and an output bus;

a counter pointing to the next address in the word of the packet to be read in the storage unit;

a finite state machine, for each cell to be built, requesting and receiving acknowledgment of segmenting information availability, repetitively activating said multiplexer with storage unit data and segmenting information data according to a finite cell pattern and sending cell data on said output bus to said cell output while incrementing said counter until said output cell is output; said finite state machine repetitively outputting cells according to said cell pattern until all the packet words are read.

The simple finite state machine is able to repetitively build all the cells corresponding to a frame because a cell pattern always applies to these cells with only two constraints. The first is to have the cell size be 64 unit (4 column unit by 16 row unit where a unit can be a byte, bit or any multiplier of bits or bytes) with a 6 unit cell header and 10 unit frame header; the second is to have the insert and overlay field have to be even. This method and apparatus can be used whenever the frame are modified during the segmenting processing by replacing a field by a definite value or when a new field is inserted in the frame or even if frames are packed into one cell.

The object of the invention is also achieved by a cell assembly method for assembling fixed length cells in an output cell resulting from the segmenting of a variable length packet stored as words in a storage unit said method using segmenting information stored in a storage control block and comprising the steps of:

requesting and receiving acknowledgment of segmenting information availability on a bus connected to an external interface;

reading the segmenting information on a first input data bus connected to the control block;

reading the variable length packet data on a second input data bus connected to the storage unit;

requesting and receiving acknowledgment of segmenting information availability;

repetitively activating a multiplexer having as inputs said two input data buses according to a cell pattern and sending cell data on a output bus of said multiplexer while incrementing a counter pointing to the next address in the word of the packet to be read in the storage unit, until said output cell is complete;

repetitively completing cells by repeating the previous steps and until all the packet words are read.

The solution of the invention applies to the options for segmenting such as replacement of a field, insertion of a field in the frame and cell packing with more than one frame per cell.

BRIEF DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

FIG. 4 illustrates a cell pattern, according to a first embodiment of the invention, repetitively applied to a frame segmented into at least 10 cells;

FIG. 6 illustrates the data movement when filling up the cells as illustrated in FIG. 4, according to a first embodiment of the invention;

FIG. 10 illustrates the data movement when filling up the cells as illustrated in FIG. 8, according to the second embodiment of the invention building cell overlay;

FIG. 11 illustrates a cell pattern, according to a third embodiment of the invention where a field is inserted in a cell, repetitively applied to a frame segmented into at least 8 cells;

FIG. 13 illustrates the data movement when filling up the cells as illustrated in FIG. 11, according to the third embodiment of the invention where a field is inserted in a cell;

FIG. 16 illustrates the data movement when filling up the cells as illustrated in FIG. 15, according to a fourth embodiment of the invention where frames are packed in the cells.

DESCRIPTION OF THE PREFERRED EMBODIMENTS

Figure 1:
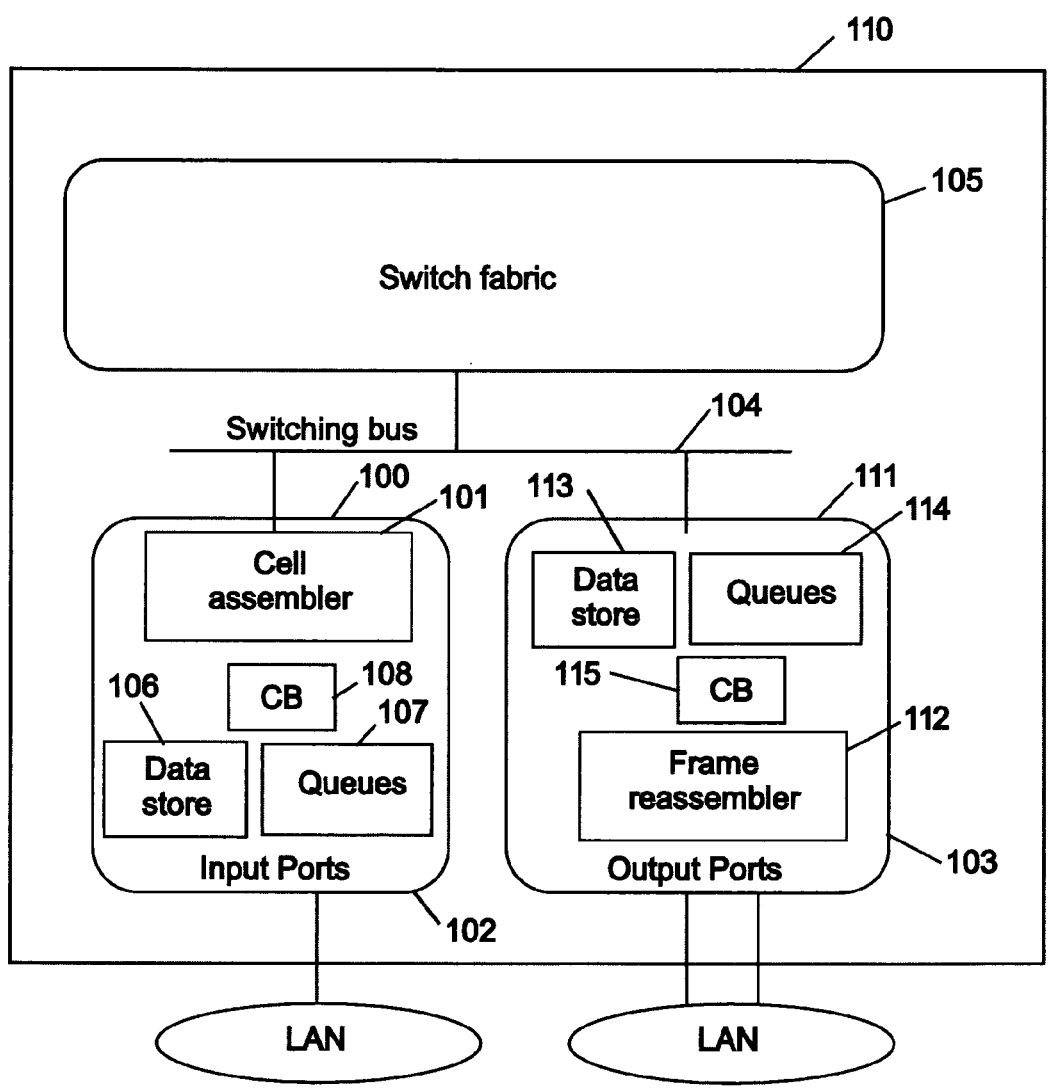
FIG. 1 is an illustration of network equipment implementing segmenting and reassembly functions and thus which can take advantage of the invention.

FIG. 1 is intended to show one networking environment where the preferred embodiments of the invention can be implemented. The preferred embodiments can be implemented in the adapters (100, 111) (also called network blades) of a switching node (110). More particularly, an embodiment is implemented as the cell assembler (101) of the adapter (100) supporting LAN lines on its input ports (102). The input adapter (100) receives variable length LAN frames from the network lines and stores them in storage units, the data store (106). The frame process is a component (not represented in FIG. 1) of the input adapter (100) which identifies the target port or ports for each frame and builds the target port queues (107) each queue pointing to series of frames to be directed to the same output port. Each queue corresponds to a frame traffic flow that the switch fabric will switch to a same output port of one other adapter (111) of the switching node. The scheduler (not represented in FIG. 1) will schedule the queues for the frame segmenting operation. The frame process in the adapter also builds and updates the control blocks (108) with the frame information. The frame segmenting process (not represented in FIG. 1) prepares the data for the cell assembler and update the control blocks with cell information as well. The cell assembler of the input adapter, using a part of the information stored in the control blocks and frame data in the data store, segments the frames corresponding to the queue scheduled by the scheduler. The frame are segmented into cells which are successively filling an output cell (210) which is sent on an output bus. The assembled cells are successively sent by another component of the adapter on the bi-directional bus (104) of the switch fabric (105) at a rate sustaining the switch speed. The switch fabric, reading the cell header directs the cell toward the output adapter (111) supporting the target outgoing port (103). In the output adapter the frame are reassembled from the switched cells and sent over the output port to the LAN network.

The cell assembler builds the cells with the scheme required by the switch fabric and as indicated in the information stored in the control blocks. More particularly the cell is characterized by a header and its fixed length size, both these parameters being adapted to the switch fabric. Other characteristics can decide of the cell format such as the possibility to include more than one frame in a cell. Cell packing is an optimization which allows avoiding losing space in cells not completely filled up by a frame. Optionally, a field in the frame has to be modified before being sent over the output network by the network node. This modification can be handled by the cell assembler which segments in cells the frames as they will be sent over the output lines by the output adapter (111). For instance, if the network node is a router, it can replace address (for instance VLAN address) in the frame before sending it over the output network. The frame modifications considered here can either replace or insert a field in the frame. This implies that some cells built from these modified frames by the cell assembler of the preferred embodiment will be modified as well.

The preferred embodiment of the invention can be also implemented for reassembling cells into frames in the adapter supporting output ports as represented in FIG. 1 (111). Queues (114) are built by a 'cell process' symmetrically to the frame process which processes input flames in the input adapter. Each queue corresponds to an output port. A scheduler designates the queue for which the cells will be reassembled. The cell reassembling process prepares the information in the control block (115) to reassemble the frame. The frame reassembler (112) will read the incoming cells, strip off the cell header and the frame header and store the cell rows in a storage unit, the data store (113). The illustration of FIG. 3 can be read from the bottom to the top to illustrate the frame reassembly process. Starting from cells forming a specific pattern, the frame reassembler is able to rebuild the corresponding eleven 16 byte segments of the frame in the data store.

Figure 2:
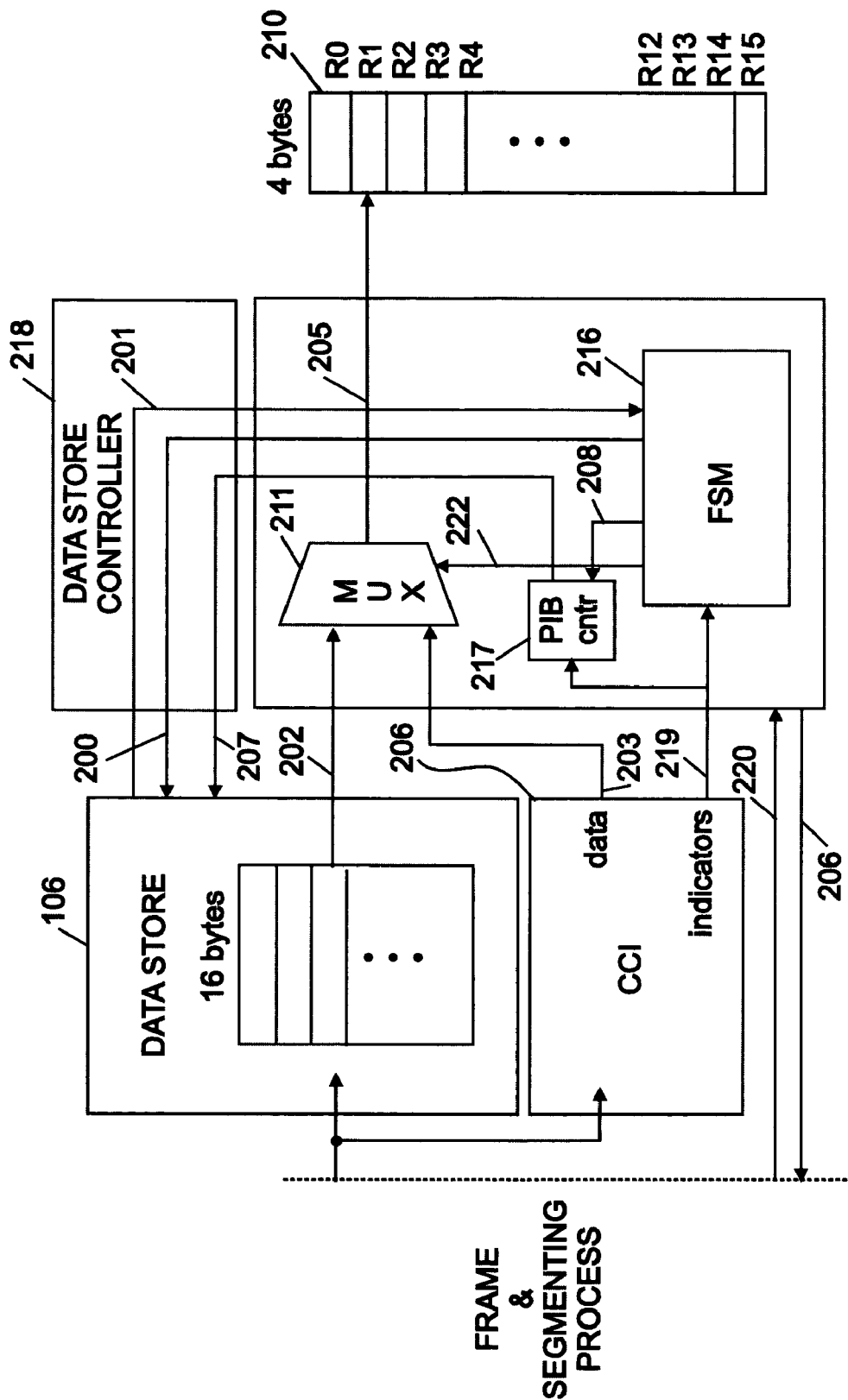
FIG. 2 is a logical block diagram showing an implementation of the invention located in the cell assembler according to the invention.

FIG. 2 shows the main logical components of the preferred embodiments. Upon the assumption that the data store has been filled up with frames received from the network and that at the same time control information has been stored in the control blocks for the cells and the frames by the other components of the adapter. We make the assumption that the frame to be segmented is one of the frames of the queue which has been scheduled by a scheduler in the adapter.

The frames are stored in a storage unit, the data store (106), by words of 16 bytes. For an example, a first frame can be a 72 byte frame, it will be stored with four 16 byte words and a last 16 byte word where only 8 bytes are used of the 16 bytes. One second frame could be a 32 byte frame filling up two words of 16 bytes. The data sturcture is explained in detail in the comments for FIG. 3 later in this document.

The frames have been stored in the data store and, in parallel, information concerning the frames and the cells to be build are stored in the control blocks (108). More particularly, the cell assembler will use in the control blocks a set of seven information forming the cell control information (CCI, 204). The frames are stored in the data store by the frame process which builds the target port queues. When a queue is scheduled, the frame segmenting process stores cell information in the control blocks, more particularly in the CCI. The cell assembler can access the CCI using buses (203, 219). New information for a cell is required by the cell assembler to the frame segmenting process using the req_cell signal (206). When the information is ready, the ack-cell signal (220) is used by the frame segmenting process to advise the cell assembler that it can start reading it. Then, the cell assembler reads the cell information in the CCI, the frame data in the data store and the cell assembler begins to build the cell one 4 byte row per clock cycle. Once built, the cell assembler requires new cell information on the bus (206) to the frame segmenting process. The new cell information is stored by the frame segmenting process.

The information in the CCI are of two kinds. They are either data such as the cell header, frame header and insert of overlay cell data. The frame header depends on the network protocol, the cell header depends on the switch fabric. The overlay data is the new data that sometimes needs to replace one defined field of the frame. This kind of operation is handled by the adapter which prepares the frame for reaching the next hop for routing purpose or other layer 3 or layer 4 OSI functions implemented in the adapter. Instead of having a field replaced in the frame, sometimes it is necessary to insert a new field in the frame. This inserted data is stored in the CCI and provided to the cell assembler to build the cell.

A second kind of information in the CCI are all the indicators. One indicator is for frame packing. This option is used for filling up all the cells without losing the space unused when a cell is not fully filled up by the previous frame. Another indicator is the data store address of the next 16 bytes. Another indicator is the initial PIB (position in buffer) which is the byte position from the beginning of the frame where to start writing the cell data (after the cell header in the cell). The last indicator used in the CCI by the cell assembler is the cell qualifier. This can be either a start of frame cell, a continuation of frame cell or a end of frame cell. Depending on the value of this qualifier, the cell assembler knows which type of cell to build. If it is a start of frame cell it will build a cell comprising a cell header followed by a frame header. If it is a continuation of frame cell, it will build a cell comprising first a cell header. If it is a end of frame, depending if the indicator of packing is on or not, the cell assembler will let the cell empty after filling up with the last bytes of the frame or, it will start writing the next frame header and next frame data.

The cell assembler accesses the data store and the CCI and outputs a cell (210) with the successive 64 bytes for each cell resulting in the segmenting of a frame. The cell is built in 16 steps each with 4 bytes transferred from the cell assembler to the output 16 wire (4 byte) bus (205). Once the 16 rows of the cell are completed, the cell is ready to be sent on the bus of the switching fabric by one other component of the adapter.

The main component of the cell assembler of the preferred embodiments is a finite state machine (216). The finite state machine handles three processes simultaneously. The first process consists in successively builds the 16 rows of the output cell according to the cell type (SOF, COF, EOF) as shown in the flow charts of FIGS. 5, 9, 12 and 15. The second process is the incrementing of the PIB as moving to the data rows, data coming from the data store or from the CCI as illustrated in FIGS. 6, 10, 13 and 16. The third process is the fetching of 16 byte frame words in the data store according to the PIB counter value analysis, this analysis being based on a repetitive cell pattern as explained later and illustrated in FIG. 7 for the first embodiment of the invention. The finite state machine of the preferred embodiments is a generic mealy/moore state machine that the man skilled in the art can generate using a high level design language.

To access the data store, the cell assembler sends a request data signal by the intermediate of the data store controller (218). The data store controller once triggered by the cell assembler via signal on the bus (200), sends a request for data to the data store. Simultaneously, the cell assemblers sends the address to the controller which uses it to access the right data (207). When the next 16 word data is ready to be sent from the data store, an acknowledge signal is sent back to the same controller on bus 201.

Another component of the cell assembler is a multiplexor (211) for multiplexing data sent on data buses from the data store or from the CCI (202, 203). This multiplexor is controlled by a signal from the finite state machine (222) and provides an output 4 byte data bus (205). The finite state machine will select from the CCI data (203) if the cell/frame header and insert/overlay data is needed. The finite state machine selects data store data (202) if frame data is needed. The multiplexer only outputs 4 bytes of data per clock cycle over the bus 205 to form a 4 byte 16 row cell (210). It takes 16 clock cycles to complete a 64 byte cell. Another component of the cell assembler is a PIB counter (217) made of the usual counter logic. The counter points to which of the 16 bytes to use to multiplex out onto bus 202. The PIB counter is a modulo 16 counter which counts from 0 to 15. The PIB counter is initialized by the finite state machine with the value got from the CCI through the 219 signal. It is updated by the finite state machine everytime data is taken from the data store and goes through the multiplexer (path 202 to 205) using the control signal 222. Either 2 or 4 bytes of data is taken from the data store at each clock cycle so that the PIB is incremented by 2 or 4 respectively.

Figure 3:
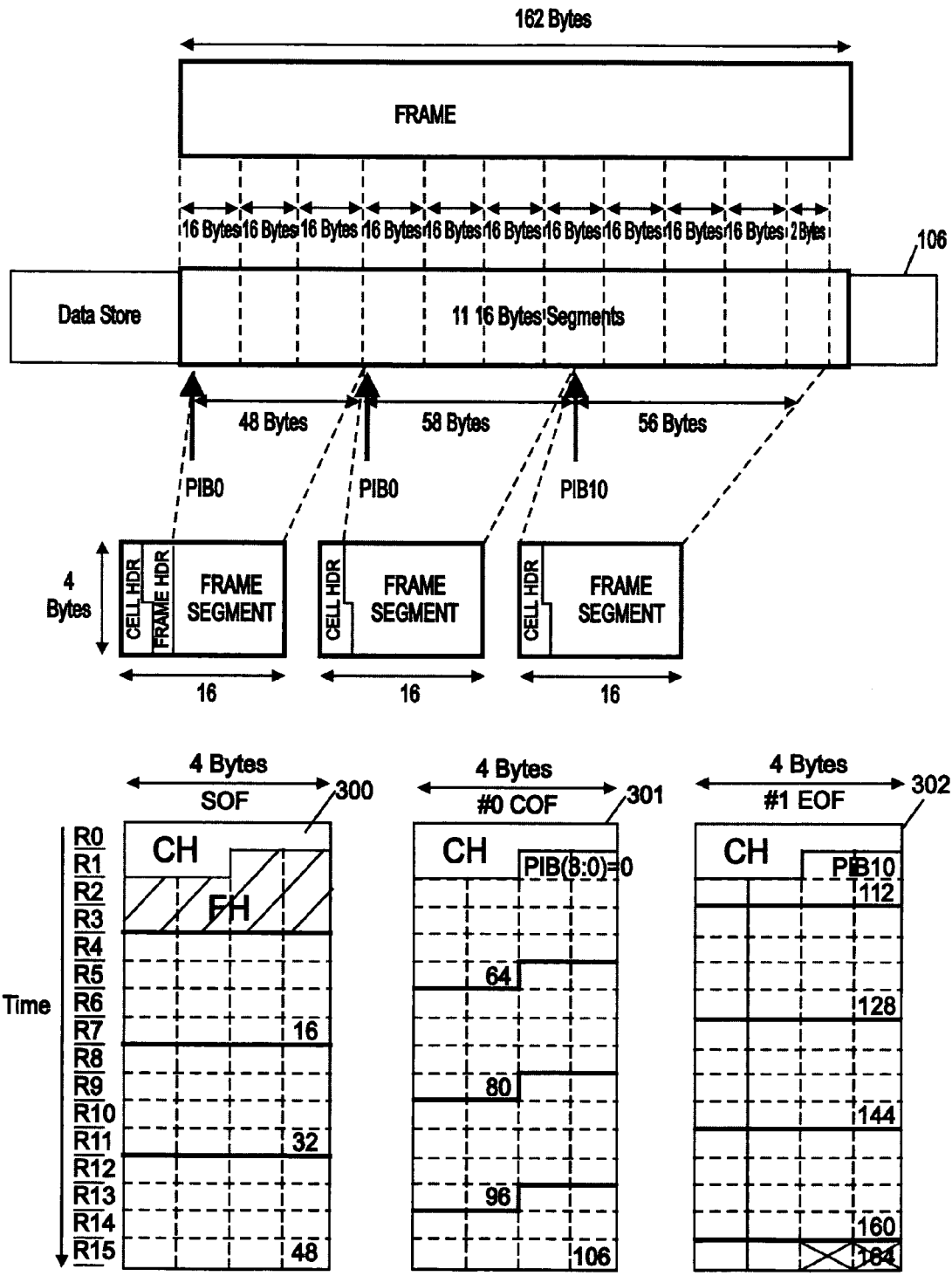
FIG. 3 is a four layer representation of the four steps used for mapping a frame on a set of cells in the cell assembler according to the invention.

In FIG. 3, is provided an illustration of the building of the three cells corresponding a 162 byte frame (300, 301, 302). The 162 byte frame has been stored in the data store in 11 words of 16 bytes, the last word being not fully filled up. For the first cell (300), the cell assembler FSM selects (using 222) the MUX input to be the CCI data (203) to output first 4 bytes of the cell header (ROW R0). On the next clock cycle, the MUX will select 2 bytes of cell header and 2 bytes of frame header (ROW R1). The FSM knows how to control the MUX since the CCI has told the FSM it is a Start Of Frame (SOF) cell. On the 3rd and 4th clock cycle (ROW R2–R3), two 4-bytes of frame header data will be built so that the top 16 bytes of the cell comprises cell and frame header (this is only true for SOF). Next the frame data from the data store is selected so that the MUX input is now 202. Again the FSM knows how to control the MUX since this is the Start of Frame. The PIB counter is initialized to zero and the data address is selected over (207). A request and ack (200, 201) of the Data Store controller occurs and the MUX will use the PIB counter as a pointer to which 4 bytes of data to select (it will select bytes 0 to 3 and the PIB counter will increment by 4 from the initial value of 0 to 4). On the next clock cycle, the next 4 bytes of data will be selected (bytes 4–7 and the PIB counter will increment from 4 to 8). This will continue 4 clock cycles (4 bytes per clock cycle) until ROW 7—R7 when the PIB modulo 16 counter will roll over back to 0. The PIB counter will then increment data store controller to next address. The next word from the Data Store is requested and acknowledged from the Data Store Controller. Since the last word fits perfectly, the PIB counter ends up at 0 on ROW R15.

For the next cell (301), the cell assembler selects the MUX input to be the CCI data to output the first 4 bytes of the cell header (ROW R0). On the next clock cycle, the MUX will select 2 bytes of cell header and 2 bytes of Data Store data (ROW R1) starting at PIB=0. The FSM knows how to control the MUX since the CCI has told the FSM it is a Continuation of Frame (COF). Since only 2 bytes of data was taken, the PIB is incremented by 2. The PIB will be incremented by 4 on rows R2–R5. On R5, the PIB modulo 16 will roll over to 2. Since the PIB has rolled over, the next word must be requested by the Data Store Controller and the MUX must get bytes 14 and 15 of the previous word as well as bytes 0 and 1 of next word. This is continued until row R15. On row R15, the PIB counter ends at 10 since the last word does not fit perfectly—there are 6 more bytes of data in this word that need to be transmitted.

For the last cell (302), the cell assembler selects the MUX input to be the CCI data to output the first 4 bytes of the cell header (ROW R0). On the next clock cycle, the MUX will select 2 bytes of cell header and 2 bytes of Data Store data (ROW R1) starting at PIB=10. The FSM knows how to control the MUX since the CCI has told the FSM it is a End of Frame (EOF). Since only 2 bytes of data was taken, the PIB is incremented by 2. The PIB will be incremented by 4 on rows R2. On R2, the PIB modulo 16 will roll over to 0. Since the PIB has rolled over, the next word must be requested by the Data Store Controller and the MUX must get of the next 16 byte word. This is continued until row R15. On row R15, the PIB counter ends at 2 since this is the last data to be transmitted.

Figure 4:
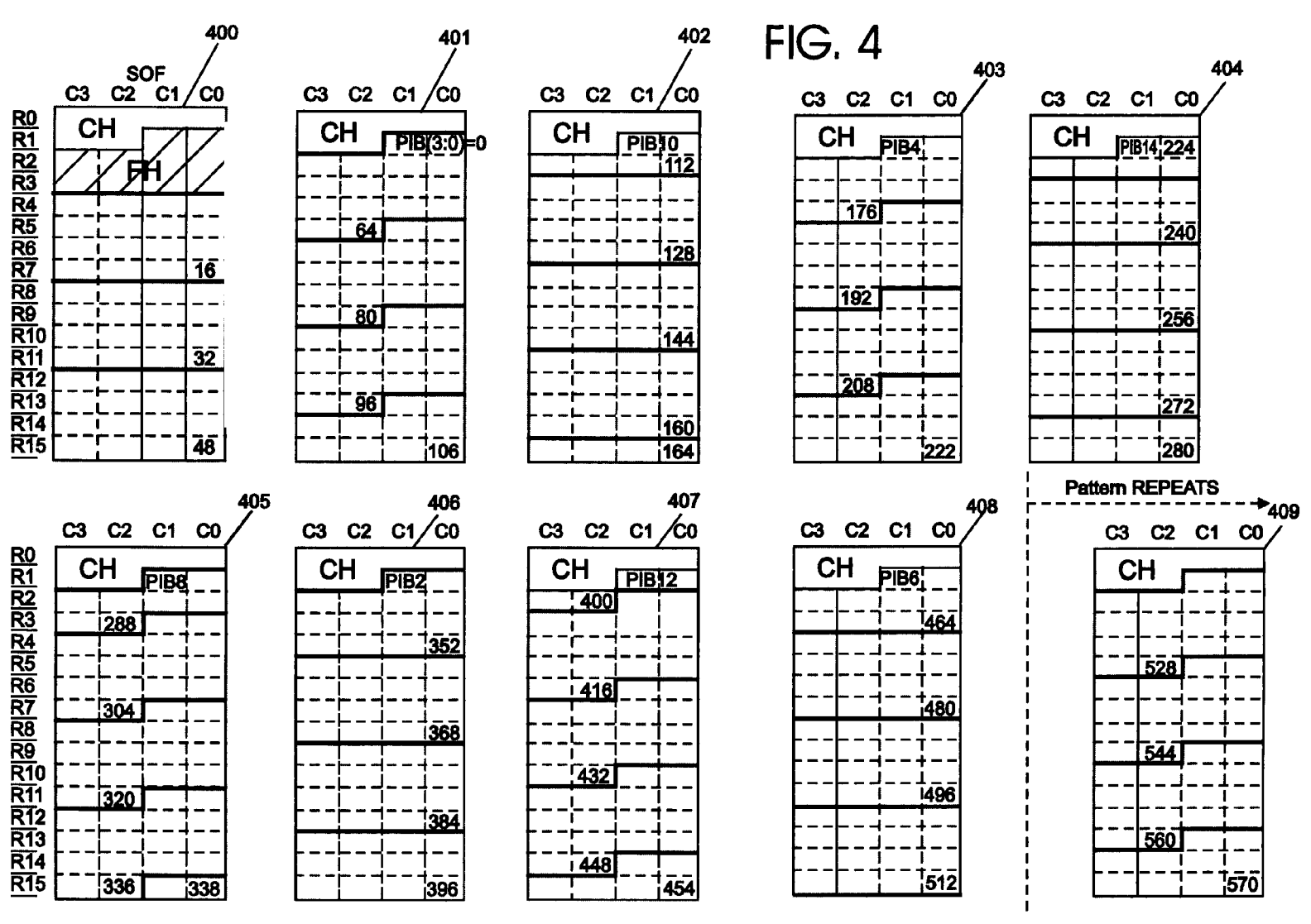

FIG. 4 displays the repetitive 16 byte cell boundary pattern used by the cell assembler of a first preferred embodiment to build cells from the frames. In this preferred embodiment, the first cell (start of frame cell) has both a cell and frame header followed by 16 byte words moved from the data store. The next cells just have the cell header followed by 16 byte words from the data store. On the ninth cell (408) the cell pattern starts to repeat. The first cell has the cell header and frame header, the other cells have the cell header and the initial PIB is respectively, as illustrated, 0, 10, 4, 14, 8, 2,12,6. The case illustrated in FIG. 4 applies to a frame of more than 512 bytes. In the case where the frame is smaller, a part of the 8 cell pattern will apply. Then the next frame can restart with a first cell (400) with cell header and the frame. If the frame length is greater than 512 bytes, a new eight cell pattern is applied for the rest of the frame. Therefore, any cell can be built given the initial PIB and CCI indicators (SOF, COF or EOF) because of the repeating pattern. This repetitiveness of the cell pattern allows the use of a finite state machine to fill them. Cells from different frames can be intermixed in any order. For example, the following cells can be sent: COF for frame A, SOF for frame A, EOF for frame B, SOF for frame C.

Figure 5:
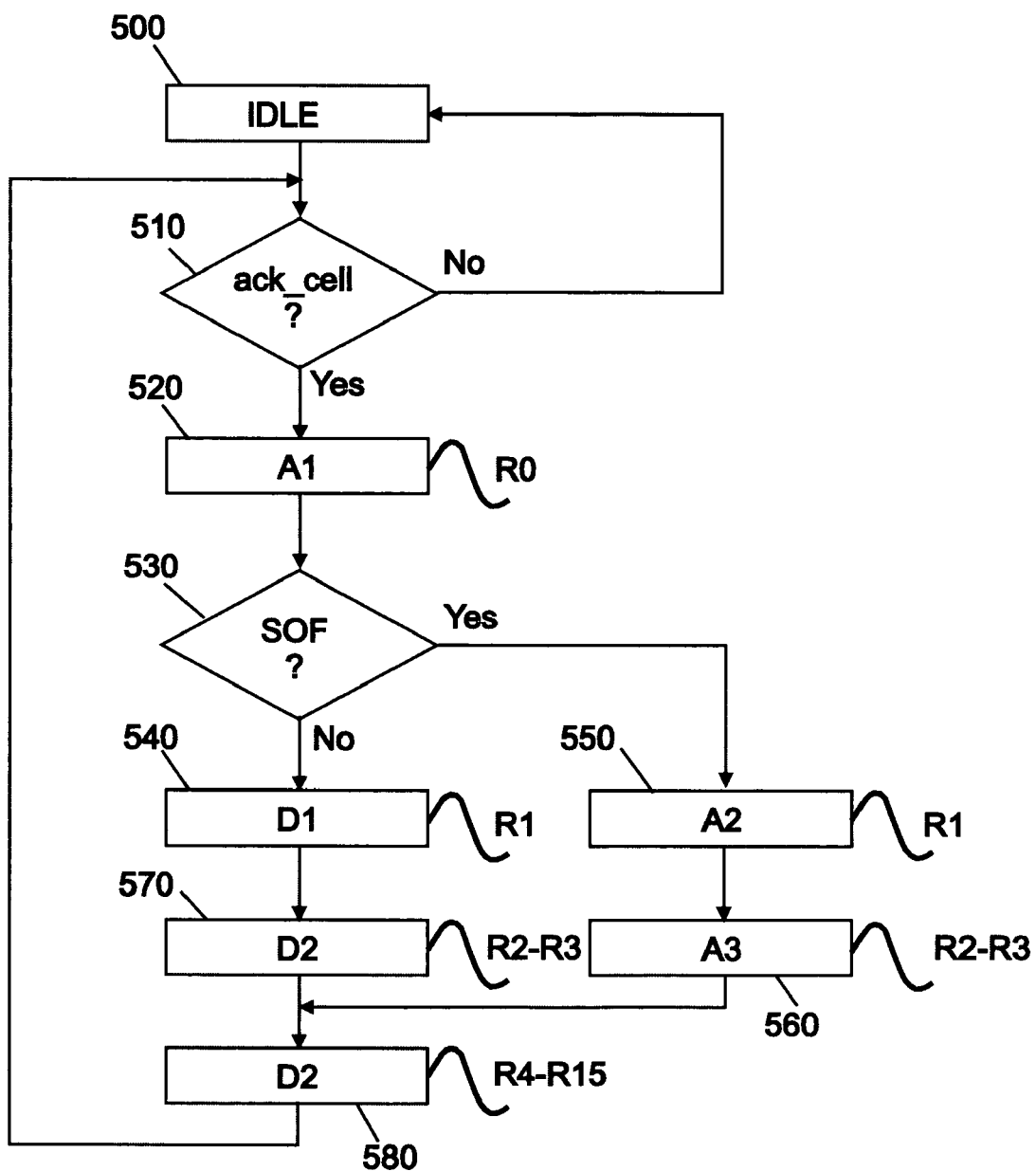
FIG. 5 is a flow chart describing the filling up of the cells as illustrated in FIG. 4, according to the a first embodiment of the invention.

FIG. 5 is a flow chart representing a FSM to assemble a cell, building a row per clock cycle. The activation of the finite state machine occurs when the cell assembler fills up the cells as illustrated in FIG. 4. The cell assembler starts to request a cell on bus 206, the finite state machine of the cell assembler is activated only if an ack signal on bus 220 is received back from the frame segmenting process. This corresponds to an answer Yes to the test 510 in FIG. 5. If not, the finite state machine stays idle (500). This corresponds to answer No to the test 510. If the cell information is available to the cell assembler, the finite state machine is able to fill up its first 4 byte row of the output cell, R0, with the a first 4 byte word, A1 (step 520) on the first clock cycle. A1 is filled up by the finite state machine also, simultaneously, with the cell header as described later in the data movement chart of FIG. 6. Then, the start of frame status is tested (530). This information is an indicator read from the CCI (219). If it is start of frame (answer yes to test 530), the cell is then filled up with the frame header as later described in FIG. 6. The next cell row, R1, is filled up with A2, a new 4 byte word (step 550). The next rows R2 and R3, are filled up also with A3, the same type of 4 byte data (step 560). If there is no start of frame, that is to say if the answer to test 530 is No, the finite state machine fills up the R1 row with D1 comprising the end of the cell header plus frame data D1, starting at the PIB as described later in FIG. 6. The next two R2 and the R3 rows are successively filled up with D2 the 2 successive following 4 bytes of frame data in the data store. In any case, either if it was a beginning of frame or not (branch yes or No of the SOF test 530), the next 12 rows, R4 to R15, of the cell are filled up with the successive 4 byte words (D2) ending the following 16 byte words of the frame in the data store. The cell is ready to be sent, the finite state machine requests for new cell information (206) and stays in idle status (500). It will be reactivated (answer yes to test 510) as soon as cell information in the CCI are ready to be used by the finite state machine to build the next cell.

FIG. 6 represents how the multiplexer selects between the data store and the CCI to fill the 4 byte by 16 row cell (210). The R0 to R15 rows are successfully filled up with the 4 byte words every clock cycle A1, D1, D2 . . . D2 (COF; EOF) or A1, A2, A3, D2 . . . D2 (SOF). The first row (R0) is filled up with A1, the first four bytes of the cell header; R1 is filled up with the last two bytes of cell header into column 3 and 2 (C3:C2). As the cell is a continuation of frame type of cell, no frame header is written; the first two bytes of the next data store 16 byte word to be read (column C1:C0) forming D1. As bytes from a 16 byte data store word is read, the PIB is incremented with the number of bytes read, that is 2. The following cell rows are filled up with 4 bytes of the same data store 16 byte word, forming D2 type of word. Each time 4 bytes are read from a data store 16 word and written in a row, the PIB is incremented of 4.

If the cell to be built is a start of frame type of cell, the second, third and fourth cell rows are filled up as shown (610). The second register comprises the two first bytes of the frame header into column 1 and 0 (C0:C1). The PIB is not updated as no data is written from the data store. The second and the third rows are filled up with the last eight bytes of the frame header and the PIB is still not updated. They are successively forming the A2 and A3 4 byte words. Coming back to 600, the rows filling up, after writing in the fourth row the 4 first bytes from the data store, forming a D2 word, the PIB is incremented of 4. This operation is repeated up to the 15$^{th}$ row of the cell.

Figure 7:
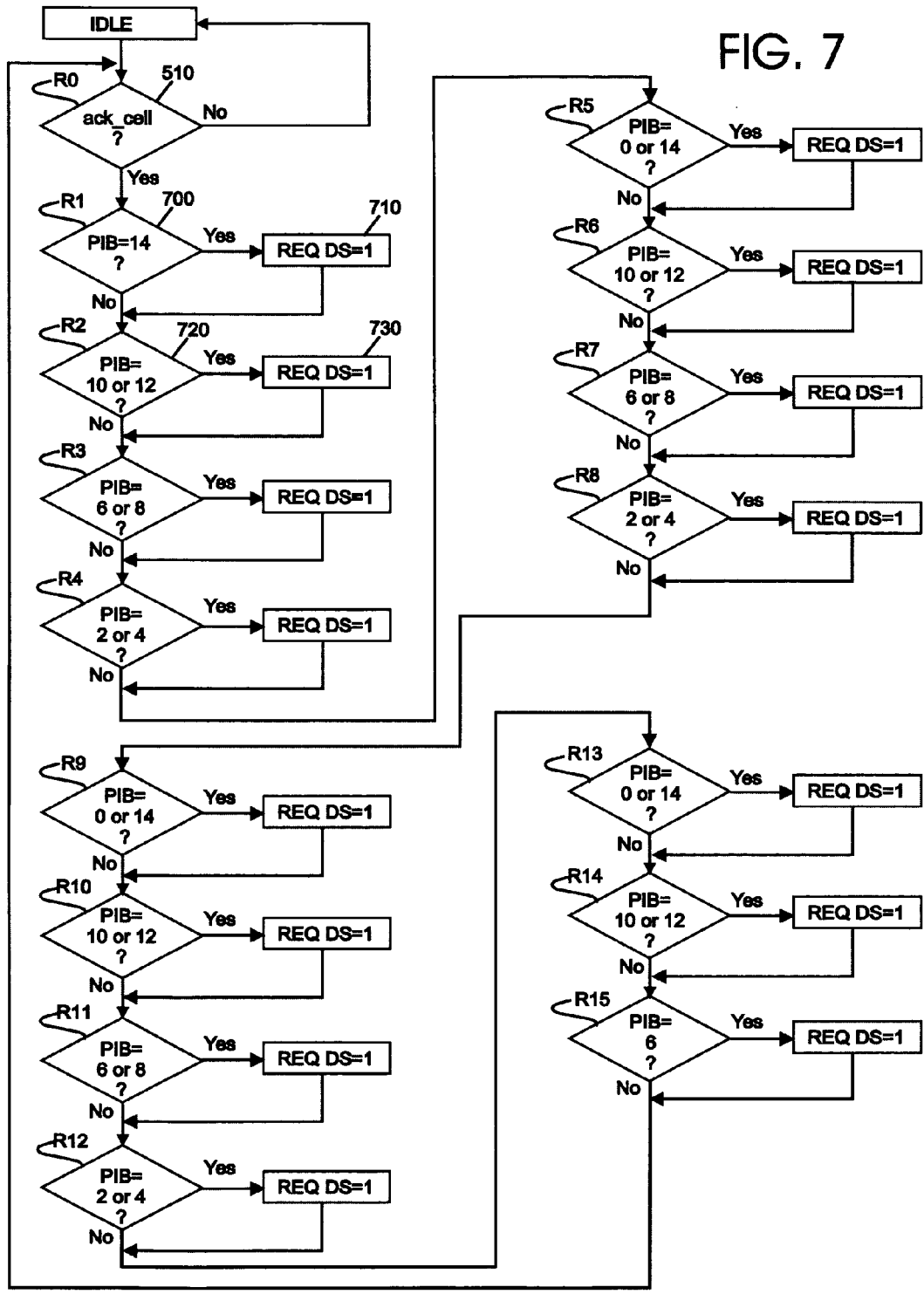
FIG. 7 illustrates the flow chart for requiring the successive words in the data store when filling up the cells as illustrated in FIG. 4, according to a first embodiment of the invention.

FIG. 7 shows the flow chart of the finite state machine of the cell assembler to access the data store and fill up these data at the right place in the cells forming the pattern as described in FIG. 4. As there is a cell pattern, the steps of the flow chart are always the same and are repeated at each cell. The principle of access to the data store is that there is a need for a new 16 byte word from the data store for filling up the row following a 16 byte virtual boundary in the cell. For instance, after writing the R1 row in the fifth cell of the cell pattern of FIG. 4 (404), a new 16 byte word must be read for preparing the next row content. Each cell of the cell pattern is characterized by its initial PIB value set in the CCI. The initial PIB acts like a key to select one of the 8 cells (401–408). A test on the value of the initial PIB characterizes the cell and thus indicates if we have to fetch a new 16 byte word in the data store.

The same test (510) for availability of the next CCI information than with the flow chart for building up the cell as illustrated in FIG. 5 is referred here. The availability of CCI information (answer Yes to test 510) as with the flow chart of FIG. 5 starts the state machine data store access process. If the answer to test 510 is No the finite state machine stays idle. When the CCI information becomes available (answer Yes to test 510), the R0 and R1 rows are filled up as described in the previous figures (FIG. 5 and FIG. 6). To fill up the R2 row, the initial PIB read in the CCI and tested. If the PIB is 14 (answer yes to test 700), this means we are filling up the fifth cell of the cell pattern (404) of the preferred embodiment described in FIG. 4, a new 16 byte word of the data store is needed to fill up the R2 row. The new 16 byte word fetched from the data store will be used by the finite state machine in its simultaneous process for filling up the cell rows, to fill up the R2 row. If the initial PIB is not 14, there is no need for fetching a new 16 byte word in the data store for filling up the R2 row. The 16 byte word previously fetched by the same process will be used by the finite state machine in its simultaneous process for filling up the cell rows, to fill up the R2 row. The next step of the flow chart of FIG. 7 is for testing if, for filling up the R3 row, a new 16 byte word need to be fetched from the data store. According to the cell pattern of FIG. 4, a new word is needed only if the finite state machine is filling up the third (402) or the eighth (407) cell of the cell pattern. That is why the initial PIB is tested (720) for the PIB values of 10 (third cell) or 12 (eighth cell). If the answer to the test is Yes, a new 16 byte word will be fetched (730) in the data store. The possible values of initial PIB of the cell to be built are tested before filling up each row of the cell. Each time there is a finite number of possible values (one or two) for the initial PIB, each value identifying one particular cell in the cell pattern as presented in FIG. 4. 15 tests similar to the first tests (700, 710) are necessary to fetch the data store each time it is necessary for filling up the cell rows.

Figure 8:
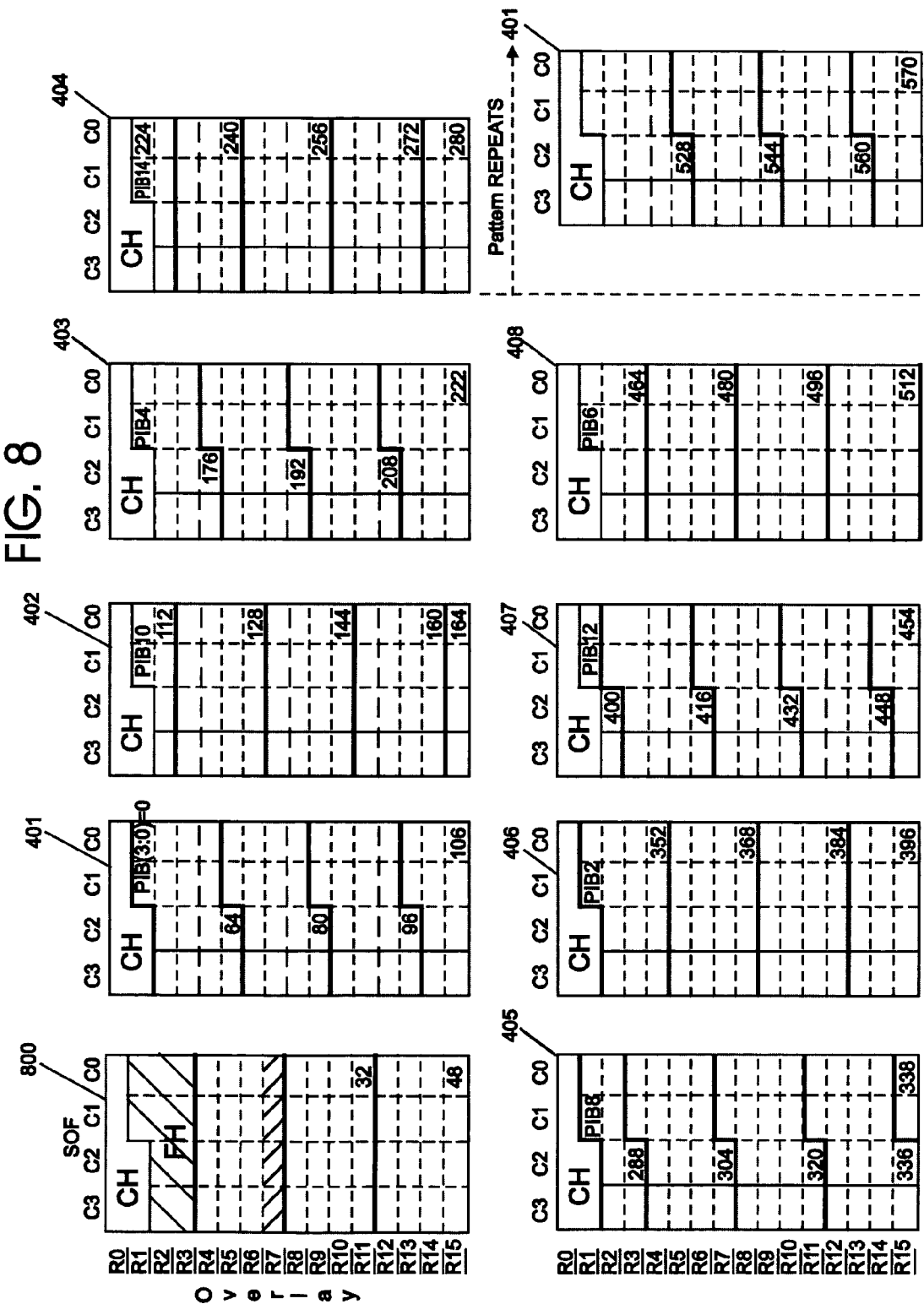
FIG. 8 illustrates a cell pattern, according to a second embodiment of the invention building cell overlay, repetitively applied to a frame segmented into at least 9 cells.

FIG. 8 illustrates the same 9 cell pattern (401–408) as illustrated in FIG. 4, result of the segmenting of a frame having at least 570 bytes by the cell assembler of a second preferred embodiment. However, the difference with the first preferred embodiment in FIG. 4 is the fact that the cell assembler, reading in one indicator of the CCI that it has to apply one overlay on a predefined field of the frame, has applied it as an additional step in its processing. The result illustrated in FIG. 8 (800) is that the fourth 4 byte word after the frame header in the frame has been replaced by a predefined 4 byte value which has been read from the data in the CCI and multiplexed on the multiplexer (211) of the cell assembler. The new value of the field in the cell can be a replacement of an address in an Ethernet frame. This could be particularly done to replace VLAN header values. Whatever the place of the field in the frame or the value of the field replacing it, this does not change the fact that, as illustrated in FIG. 8, the cell pattern is respected and the same cell assembly method is used.

Figure 9:
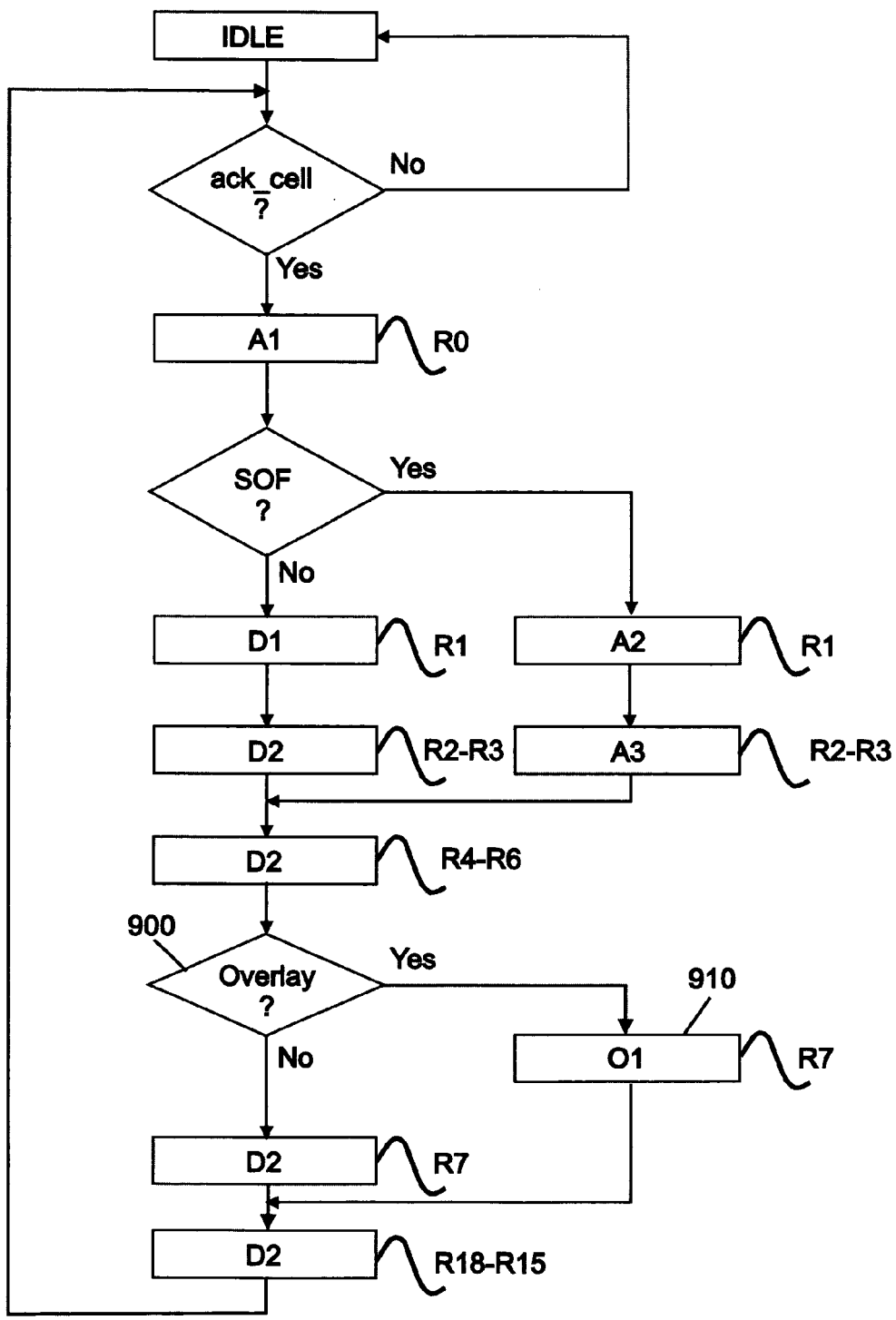
FIG. 9 is a flow chart describing the filling up of the cells as illustrated in FIG. 8, according to the second embodiment of the invention building cell overlay.

FIG. 9 is the flow chart illustrating the cell building by the finite state machine in the case of the overlay option according to the cell pattern presented in FIG. 8. The first steps are similar to those of FIG. 5. A new step in the flow chart is performed before writing the R7 row, where the modification of the bytes take place. A new test is added checking if the cell to be written is the one having an overlay (900). In the case illustrated here, only the first cell will have an overlay. If the finite state machine is not building the first cell, the previous step is replaced by a filling up of the R7 row by the usual D2 like 4 byte word, that is the 4 bytes coming from the current 16 byte word read from the data store. After filling up the R7 row, the process goes on as with the flow chart of FIG. 5 for the filling up of the following rows of the cell up to the last R15 row.

FIG. 10 illustrates the data movement for each cell register in the case of overlay. Similarly to the data movement illustrated in FIG. 6, the movement of data can be for building the start of frame cell (1001 and 1002) or for building a continuation of frame cell (1001). However, a new data movement occurs when the cell to be built is the one having the overlay (the first cell of the frame in the preferred embodiment illustrated in FIG. 9). In this case (1003) the bytes 0 to 3 (column C3:C0) of the R7 row of the first cell is replaced by the new predefined 4 byte data. As usual when filling up the row, the PIB counter is incremented with the number of bytes even if these bytes do not come from the data store. This means that 4 bytes are skipped in the data store. The data movement goes on as in FIG. 6 restarting at the R8 row.

It is noted that the 16 byte word fetch processing from the data store is identical with the first or the second embodiment. It corresponds to the cell pattern as described in FIG. 7.

FIG. 11 illustrates the new cell pattern obtained when segmenting a frame while inserting a new field in the segmented frame. In this new embodiment the new field is inserted after the R6 row (1100). This can be used to insert VLAN header information. Compared to the cell pattern of the first preferred embodiment illustrated in FIG. 4 or the cell pattern of the second preferred embodiment illustrated in FIG. 8 with overlay, the pattern has changed but it still results in the same cell pattern but in a different order (407, 408, 401, . . . 406) compared to FIG. 4 and FIG. 8 (401, 402, . . . 408). The same cell assembler components as described with the first embodiment of the invention (FIG. 2) are used also for building the cells in the case of the third embodiment. More particularly, a new cell order applies but a similar finite state machine can be repetitively used to build the cells.

In the new cell order of FIG. 11, there are still only 8 cells before the pattern repeats. As the insertion occurs in cell 1 (1106), the second cell starts with an initial PIB of 12 compared to the initial PIB of 0 (401) in the first and second embodiments. The following PIB values of the successive cells have changed also compared to the PIB at the beginning of each cell of the cell pattern of FIG. 8 and FIG. 4. However, the pattern repeats after cell 8 and a similar finite state machine can be implemented in the cell assembler of the third embodiment. It is noted that with it an insertion field located in one other place in the cell or in one other cell, or if the size of the field to be inserted is different, the cell pattern will be different from the one illustrated in FIG. 11.

Figure 12:
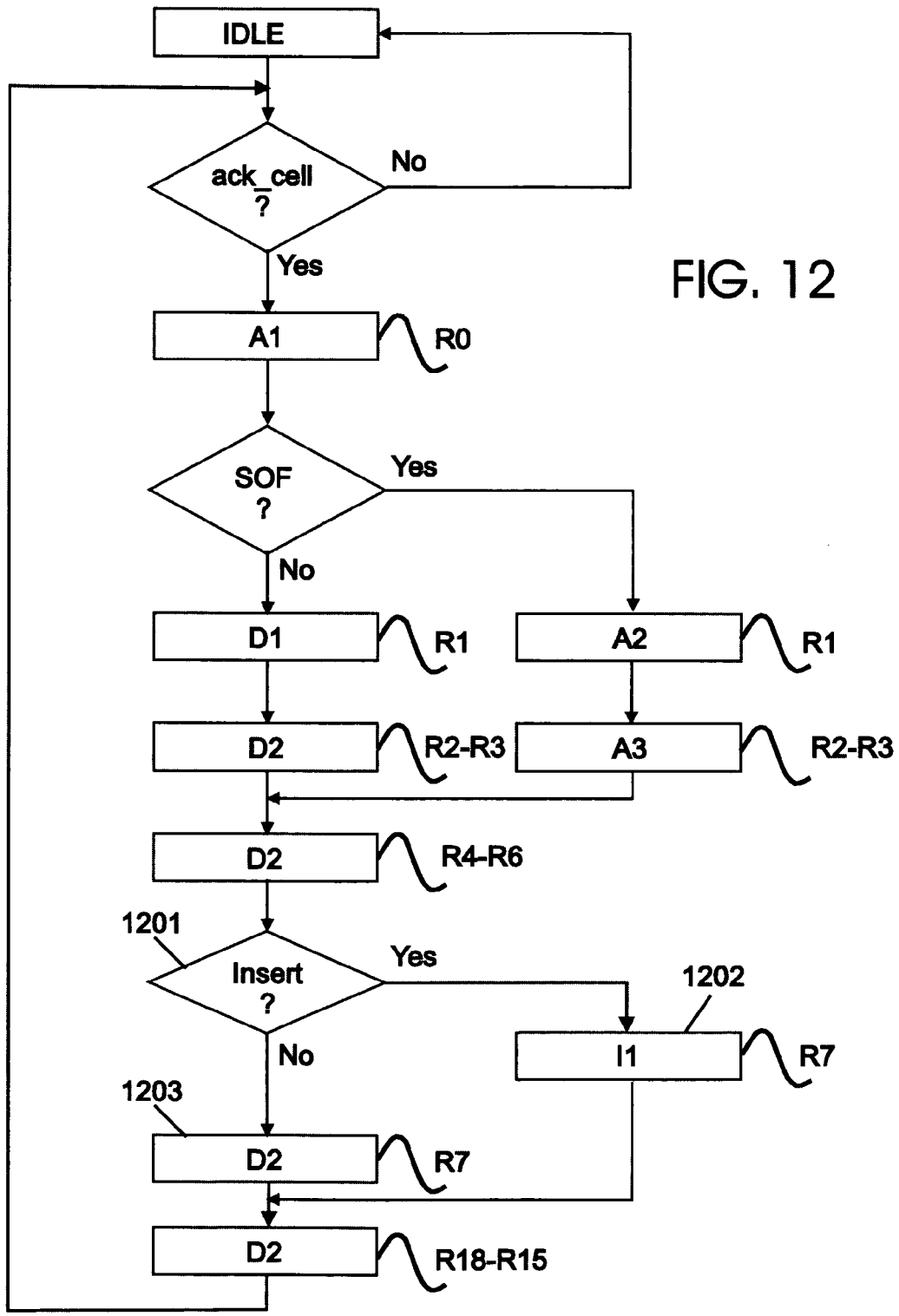
FIG. 12 is a flow chart describing the filling up of the cells as illustrated in FIG. 11, according to the a third embodiment of the invention where a field is inserted in a cell.

In FIG. 12 the flow chart illustrates the steps of the finite state machine when filling up the cells coming from the segmenting of frames. This flow chart reflects the insertion of a new field located at the $7^{th}$ 4 byte word of the first cell as illustrated in FIG. 11 (1100). Compared to the flow chart of the first embodiment illustrated in FIG. 5, this flow-chart comprises an additional step before writing the R7 row compared to FIG. 9, this flow-chart looks almost identical except using insert instead of overlay. If the insertion indicator in the CCI is set to indicate that there is an insertion to perform for this cell (answer Yes to test 1201), the insertion of data (I1) is performed (1202) in the R7 row. If the cell is not the one where the insertion must take place, the R7 row is filled up with the content of the next 4 byte word read from the data store (1203). The next steps are for filling up the following rows in the cell from the R8 row up to R15 row. As with the other embodiments, this same flowchart is performed repetitively until all the cells are all filled up for the concerning frame.

FIG. 13 illustrates the data movement performed from the data for the segmenting of the third embodiment. The first row is filled up with the first 4 bytes of the cell header. The following row comprises the two bytes of the end of the cell header and starts filling up with data from data store in the case where the cell is not a start of frame cell. If it is a start of frame cell the R1 row starts being filled up with the frame header first bytes (1302). The two following rows are also filled up with the remaining bytes forming the frame header. Each time such a transfer occurs, the PIB counter is incremented with the number of bytes transferred from the data store. However, if the cell is the one including the place where new data is to be inserted, the first cell in this embodiment, a new field is added without incrementing the PIB counter as this data does not come from the data store. The data is inserted in this embodiment in the R7 row of the first cell of the frame (1303). The other following registers are filled up with the data store bytes as illustrated in 1301. Once the R15 row of the first cell has been filled up the PIB value obtained is 4 less than the PIB value of the first and second embodiment as described in FIG. 6 and FIG. 10. This explain that the cell pattern in this third embodiment is different than with the two first embodiments.

It is noted that the 16 byte word fetch processing from the data store is not identical to the first or the second embodiment because the cell pattern is different for the SOF cell (1100). However, a man skilled in the art will be able to adapt the flow chart of the first and second embodiment illustrated in FIG. 7 to include tests for SOF and insert, otherwise FIG. 7 can be used without modification for COF/EOF cells (407, 408, 401, 402 . . . 406). For each row to be filled up different initial PIB values are tested. Finally, the flow chart has still a repetitive and limited number of tests which are applied for each cell to be tested.

Figure 14:
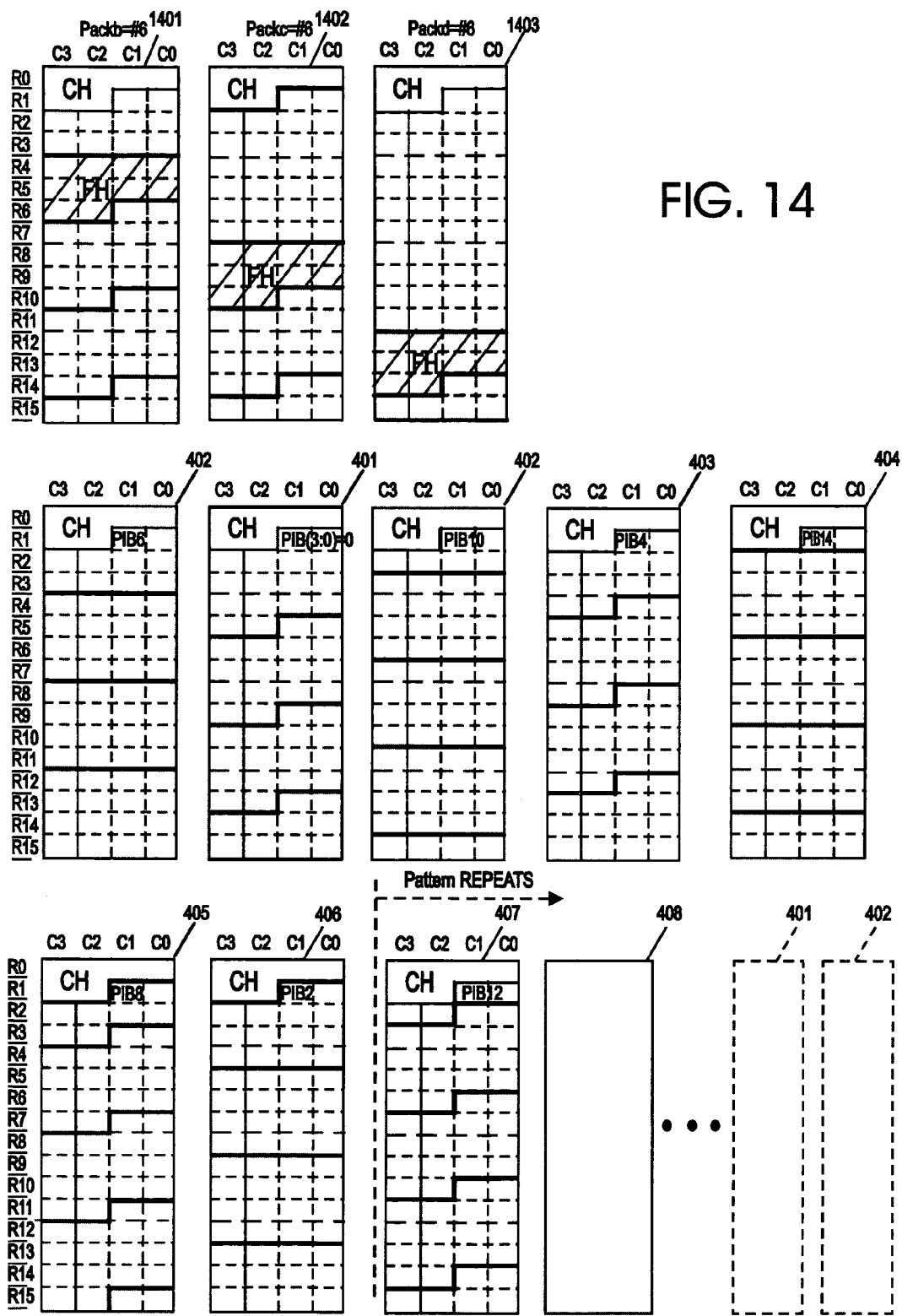
FIG. 14 illustrates a cell pattern, according to a fourth embodiment of the invention where frames are packed in the cells, repetitively applied to a frame segmented into at least 8 cells.

FIG. 14 illustrates the cell patterns for a fourth embodiment which is frame segmenting with the option of cell packing. As explained above for reason of space saving in the cells, each cell can be packed with more than one frame per cell. The fourth embodiment using this option implies the use of a different cell pattern which can be such as the one illustrated in FIG. 14. In this fourth embodiment according to a specific cell packing rule, three cases are possible as for the placement of the frame header in the cell. In cell 1401 the frame header field starts at the R4 row. The second cell (408) has an initial PIB value of 6. The packing rule may authorize also to pack the frame in the cell in such a way that a frame header field can start in the R8 row of a cell. This is the second case represented in FIG. 14, the first cell being 1402 for this case. A third case also would be to have the frame header field starting at the R12 row, the first cell in this case is 1403. It is noted that with the three cases, the initial PIB value of the next cell (408) to be written in the cell pattern is 6. In summary, as the frame packing rule authorizes the frame header to start at the R4 row, R8 row or R12 row, the same cell pattern applies it will comprise a first cell which is either 1401, 1402 or 1403 and the seven following cells represented in FIG. 14 starting at 408 and up to the 407 eighth cell. After the eighth cell the cell pattern restarts with a first cell whom the PIB is 12 (407) this cell is characterized in that the following cell will have an initial PIB of 6, corresponding to the second cell (408) of the cell pattern.

Figure 15:
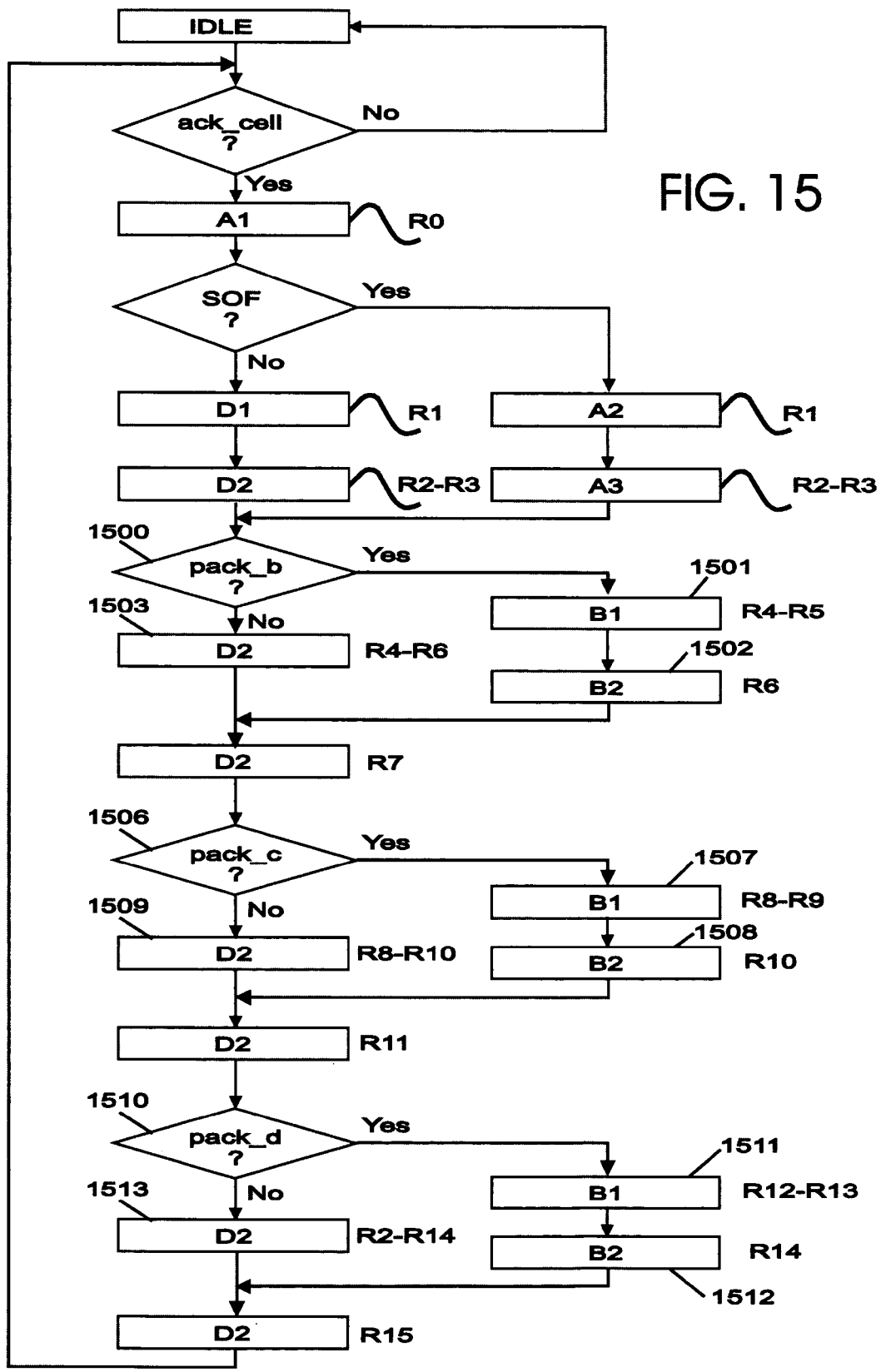
FIG. 15 is a flow chart describing the filling up of the cells as illustrated in FIG. 15, according to the the fourth embodiment of the invention where frames are packed in the cells.

FIG. 15 shows the flow chart for filling up the cells according to the fourth preferred embodiment, corresponding to the case where the frames are packed in the cells. This flow chart is in accordance with the cell pattern of the fourth embodiment as represented in FIG. 14. The flow chart also follows the rules for packing stipulating that a frame header can start in the cell at row 4, 8 or 12. This is why the building of rows R0 to R3 starts as with the other first embodiments. Starting at the R4 row, the indicator for packing stored in the CCI for the cell is tested. If the answer for packing is yes for this cell and at this row (anser Yes to test 1500), the frame header is stored in the R4 and R5 rows (1501) as 4 byte words according to the first cell of the cell pattern illustrated in FIG. 14 (1401). Then the following row, R6, is filled up (1502) with the B2 4 byte word containing both the end of the frame header and the beginning of the frame itself. If the cell is not a cell wherein the frame is packed (answer No to test 1500), the beginning of the frame itself is entered (1503) in the R4 to R6 rows as D2 4 byte words. Then the following row, R7, is filled up with a usual D2 4 byte word from the frame. For filling up the next row, R8, the indicator for packing stored in the CCI is tested. If packing is requested for this cell and at this row (answer Yes to test 1506), the frame header is stored in the R8 and R9 rows (1507) as 4 byte words according to the first cell of the cell pattern illustrated in FIG. 14 (1402). Then the following row, R10, is filled up (1508) with the B2 4 byte word containing both the end of the frame header and the beginning of the frame itself. If the cell is not a cell wherein the frame is packed (answer No to test 1506), the beginning of the frame itself is entered (1509) in the R8 to R10 rows as D2 4 byte words. Then the following row, R11, is filled up with a usual D2 4 byte word from the frame. For filling up the next row, R12, the indicator for packing stored in the CCI is tested. If packing is requested for this cell and at this row (answer Yes to test 1510), the frame header is stored in the R12 and R13 rows (1511) as 4 byte words according to the first cell of the cell pattern illustrated in FIG. 14 (1403). Then the following row, R14, is filled up (1512) with the B2 4 byte word containing both the end of the frame header and the beginning of the frame itself. If the cell is not a cell wherein the frame is packed (answer No to test 1510), the beginning of the frame itself is entered (1513) in the R12 to R14 rows as D2 4 byte words. Then the following row, R15, is filled up with a usual D2 4 byte word from the frame and the cell is completed.

FIG. 16 describes the finite state machine process for filling up the 4 byte words forming the successive rows of the cell and the incrementing of the PIB counter. The 1601 table describes the different rows of a cell comprising no frame header A1 and D1 comprise the cell header and the following 4 byte words D2 comprise the frame data itself. Each time bytes from the frame are written in the rows the PIB counter is incremented of a value equal to the number of bytes written. This value is 0 for the first row containing the cell header only, the incrementing value is 2 after filling up the R2 row containing 2 bytes of the frame and for all the other rows of the cell whom data corresponds to the first table (1601) the incremented value of the PIB counter is 4. The second table (1602) represents the movement of data in the case where a frame header is written in the cell. The 4 byte words A3 are those used as in the previous preferred embodiments, when the frame header starts just after the cell header in the cell. The B1 and B2 words are used (1603) for filling up the rows 4, 5 and 6 of the cell when a frame header is written. B1 comprises frame header data only, B2 comprises 2 bytes of frame header data and 2 bytes of frame data itself. When filling up B2, the finite state machine increments the PIB counter with 2. The same filling up of two B1 4 byte words and one B2 4 byte word is performed if a frame header is entered at row 8 (1604) or at row 12 (1605) of the cell.

The same preferred embodiments are used for forming the frame reassembly in an output adapter (111) receiving fixed length cells from the bidirectional bus of the switched fabric and having to rebuild the variable length frames before sending them on the target LAN output ports (103). The frame assembler of the output adapter will use CCI information provided by a cell reassembly process to rebuild the frame. The second inputs are the cells themselves. The CCI and cell inputs are multiplexed in a two entry multiplexer. The output bus of the multiplexer is for transferring the frame data to the data storage. A finite state machine reading the information in the CCI and the cell data is able, according to the same cell pattern as in the input adapter, to rebuilt the successive data storage words of the frame data. The finite state machine activates the multiplexer in such a way that the cell header and frame header are suppressed. As in the cell assembler of the input adapter, the frame reassembler maintains a unique counter initialized to zero at the beginning of the cell reading and maintains this counter with the address in the word of the data storage where the next cell data will be written. As with the cell assembler the counter is incremented modulo 16, the word length in the data storage. When using the preferred embodiments the flow chart of FIG. 5 is used for frame reassembly for each row read from the cell filled up by the switch fabric. As in FIG. 6, for each cell row, data can be stored in the data store until a 16 byte word is formed. A new 16 byte word is to be built as the cell pattern is known and the PIB value is known as explained in FIG. 7. The frame stored in the data store as 16 byte words will be used by the output scheduler to send the frames as soon as they are ready. This scheduling being the equivalent process available in the input adapter also for reading frame and writing them by 16 byte words in the data store.

While there have been described what are considered to be preferred embodiments of the present invention, variations and modifications in the preferred embodiments will occur to those skilled in the art once they are made aware of the invention. There are two constraints for using the preferred embodiments of the invention; the first is to have the cell size be 64 unit (4 column unit by 16 row unit where a unit can be a byte, bit or any multiplier of bits or bytes) with a 6 unit cell header and 10 unit frame header; the second is to have the insert and overlay field have to be even. Under this condition, a cell pattern similar to those described in the preferred embodiments can always be used to build the cells in the segmenting process or to rebuild the frame in the frame re-assembly process.

Another variation is instead of variable length frames, this invention can easily be modified to convert fixed length cells such as 53 byte ATM cells into 64 byte PRIZMA cells. The encapsulation of 53 byte cells into 64 byte cells can be accomplished by just sending cell pattern 401 in FIG. 4 since the frame header is not needed. The advantage of this is that the invention is flexible enough so that a same cell assembly apparatus according to the invention can be used for multiple protocols (ATM, Ethernet, Token Ring, etc) with little modification.

Therefore, it is intended that the appended claims shall be construed to include not only the preferred embodiments but all such variations and modifications that fall within the true spirit and scope of the invention.

What is claimed is:

1. An apparatus for segmenting variable length packet and forming fixed cell therefrom comprising:
   a storage unit, with storage capacity greater than storage capacity of a one byte register, for storing the variable length packet;
   a storage control block for storing segmenting information;
   a bus connected to an external interface to request and receive acknowledgment of segmenting information availability;
   a first input data bus connected to the storage control block to read the segmenting information;
   a second input data bus connected to the storage unit to read predefined portions of said variable length data packet to be used to form the fixed cell;
   a multiplexer having two inputs with one of said two inputs connected to the first input data bus and the other of said two inputs connected to the second input data bus wherein the data packets used to form the fixed cell are extracted directly from the storage and not buffered in a register connected between the storage and said multiplexor;
   a counter having an input connected to the storage control block and an output connected to the storage unit, said counter pointing to the next address in the word of the packet to be read in the storage unit;
   a finite state machine having an input connected to the storage control block, a first output connected to the counter and a second output connected to the multiplexer said finite state machine, for each cell to be built, requesting and receiving acknowledgment, over said bus connected to said external interface, of segmenting information availability, repetitively activating said multiplexer with storage unit data and segmenting information data according to a finite cell pattern and sending cell data on said output bus to said cell output while incrementing said counter until said output cell is complete; said finite state machine repetitively outputting cells according to said cell pattern until all the packet words are read.

2. The apparatus of claim 1 further comprising two buses connected to a storage unit controller controlling said storage unit, one bus being connected to the counter and sending the address to read in the storage unit and one bus connected to the finite state machine to send request for data availability on the multiplexer first input bus reading and to receive acknowledgment for storage unit data availability on the multiplexer first input bus.

3. The apparatus of claim 1 wherein the control block comprises the packet header and the cell header having respectively 6 unit and 10 unit length, said finite state machine activating said multiplexer with said headers and storage unit data to build the cells according to said cell pattern.

4. The apparatus of claim 1 wherein, the control block comprises a data field having an even length to be replaced in the packet so that said finite state machine activates said multiplexer with said data field and storage unit data to build the cells with the replaced field according to said cell pattern.

5. The apparatus of claim 1 wherein, the control block comprises a data field having an even length to be inserted in the packet, so that said finite state machine activates said multiplexer with said data field and storage unit data to build the cells with the inserted field according to a cell pattern with a different cell order than the cell pattern used when no data field is inserted in the packet.

6. The apparatus of claim 1 wherein the counter is read from the segmenting information at each new cell and incremented by said finite state machine, modulo the storage unit word length, of the length of said cell data sent on said output bus.

7. The apparatus of claim 1 wherein said storage unit word length is 16 bytes, said multiplexer output bus is a 4 byte bus and said cell fixed length is 64 bytes, said output cell being filled by 16 clock cycles sequencing said finite state machine, with 4 bytes at each clock cycle.

8. A method to assemble fixed size cell:
   providing a storage unit, with storage capacity greater than storage capacity of a one byte register, for storing the variable length packet;
   providing a storage control block for storing segmenting information;
   requesting and receiving acknowledgment of segmenting information availability on a bus connected to an external interface;
   reading the segmenting information on a first input data bus connected to the control block;
   reading the variable length packet data on a second input data bus connected to the storage unit;
   requesting and receiving acknowledgment, over a bus interconnecting a Finite State Machine to an external interface of segmenting information availability;
   repetitively activating a multiplexer having as inputs said two input data buses according to a cell pattern and sending cell data on a output bus of said multiplexer to said output cell while incrementing a counter pointing to the next address in the word of the packet to be read in the storage unit, until said output cell is complete.

9. The method of claim 8 further comprising:
   requesting availability of said storage unit data on said first input bus by sending a signal via a signal bus to a storage unit controller and by sending the counter address where to read said storage unit via one other bus; and,
   receiving an acknowledgment for storage unit data availability via said signal bus.

10. The method of claim 8 further comprising activating said multiplexer with cell header and packet header, having respectively 6 unit and 10 unit length, stored in said storage control block and available on said second input bus and sending the data on said output bus according to said cell pattern.

11. The method of claim 8 further comprising activating said multiplexer with an even length field stored in said control block, available on said first input bus to replace a same length field in the packet data to be stored in the cell according to said cell pattern.

12. The method of claim 8 further comprising activating said multiplexer with an even length field stored in said control block, available on said first input bus to be inserted in the packet data to be stored in the cell according to said cell pattern; said cell pattern being differently ordered than the cell pattern used when no data field is to be inserted in the packet data.

13. The method of claim 8 further comprising reading the counter value in the segmenting information at each new cell and wherein said incrementing step is done, modulo said storage unit packet word length, with the length of said cell data sent on said output bus.

14. The method of claim 8 wherein said storage unit word length is 16 bytes, said multiplexer output bus is a 4 byte bus and said cell fixed length is 64 bytes.

15. The method of claim 8 further including repetitively completing cells by repeating the previous steps and until all the packet words are read.

16. An adapter in a network equipment comprising:
   input ports receiving network variable length data packets;
   a frame process component storing as words said data packets in a storage unit creating queues of packet going to the same destination address and creating control blocks with packet information;
   a scheduler designating a packet queue to be served at a given time; and
   a packet segmenting process component preparing segmenting information for assembling each 64 unit fixed length cell from packets in packet queues the packet segmenting process component comprising:
   a storage unit, with storage capacity greater than storage capacity of a one byte register, for storing the variable length packet;
   a storage control block for storing segmenting information;
   a bus connected to an external interface to request and receive acknowledgment of segmenting information availability;
   a first input data bus connected to the storage control block to read the segmenting information;
   a second input data bus connected to the storage unit to read said variable length data packet;
   a multiplexor having as inputs the two said input data buses and an output bus;
   a counter pointing to the next address in the word of the packet to be read in the storage unit;
   a finite state machine, for each cell to be built, requesting and receiving acknowledgment of segmenting information availability, repetitively activating said multiplexer with storage unit data and segmenting information data according to a finite cell pattern and sending cell data on said output bus while incrementing said counter until said output cell is completed; said finite state machine repetitively filling said output cells according to said cell pattern and until all the packet words are read.

* * * * *